United States Patent [19]

Higuchi et al.

[11] Patent Number: 4,659,508

[45] Date of Patent: Apr. 21, 1987

[54] ELECTRICALLY-CONDUCTIVE SINTERED COMPACT OF SILICON NITRIDE MACHINABLE BY ELECTRICAL DISCHARGE MACHINING AND PROCESS OF PRODUCING THE SAME

[75] Inventors: Matsuo Higuchi; Masaya Miyake; Hisao Takeuchi; Eiji Kamijo, all of Hyogo, Japan

[73] Assignee: Sumitomo Electric Industries, Ltd., Osaka, Japan

[21] Appl. No.: 794,675

[22] Filed: Nov. 4, 1985

[30] Foreign Application Priority Data

Nov. 5, 1984 [JP] Japan .................................. 59-232674

[51] Int. Cl.$^4$ ...................... C04B 35/58; C04B 35/56
[52] U.S. Cl. .................................. 252/516; 252/520; 264/65; 501/87; 501/96; 501/97; 501/98
[58] Field of Search ....................... 501/97, 98, 96, 87; 252/516, 520; 264/65

[56] References Cited

U.S. PATENT DOCUMENTS 3,890,250  6/1975  Richerson .......................... 252/516
4,528,121  7/1985  Matsushita et al. .................. 501/97

FOREIGN PATENT DOCUMENTS 58-20782  2/1983  Japan ..................................... 501/97
58-41771  3/1983  Japan ..................................... 501/97
58-95644  6/1983  Japan ..................................... 501/97

Primary Examiner—Mark L. Bell
Attorney, Agent, or Firm—Cushman, Darby & Cushman

[57] ABSTRACT

An electrically-conductive sintered compact of silicon nitride which is machinable by electrical discharge machining and a process to produce the same. TiN and/or TiC powder is added to a powder of silicon nitride in an amount 15–40% by volume to act as a conductivity-supplying agent while 0.01–3.0% by volume MgO and/or $Al_2O_3$ powder is added as a sintering assistant. The mixed powders are then preformed in a desired shape and sintered in a nonoxidizing environment at 1,600° C.–2,000° C. to obtain a compact of silicon-nitride machinable by electrical discharge machining due to its electrical conductivity being at least 1 $S \cdot cm^{-1}$.

7 Claims, 5 Drawing Figures

ELECTRICALLY-CONDUCTIVE SINTERED COMPACT OF SILICON NITRIDE MACHINABLE BY ELECTRICAL DISCHARGE MACHINING AND PROCESS OF PRODUCING THE SAME

FIELD OF THE INVENTION

The present invention relates to a sintered compact of silicon nitride which has a high electrical conductivity and can be machined by electric discharge machining, and to a process for producing the same.

BACKGROUND AND SUMMARY OF THE INVENTION

A sintered compact of silicon nitride (hereinafter called a "sintered compact of $Si_3N_4$" for ease of reference) is known not only as a material having excellent oxidation resistance but also as a material having a low coefficient of thermal expansion and intensive strength properties at high temperatures. Moreover, research and development activities are being conducted to enable sintered compacts of $Si_3N_4$ to be utilized as a high-temperature structural material for turbine engine blades and nozzles and for heat exchange members, to name a few.

However, because powder metallurgy is normally employed to produce sintered compacts of $Si_3N_4$, it is difficult to obtain sintered compacts having complicated shape configurations, accurate dimensions and planes. Finished shaped products of sintered compacts of $Si_3N_4$ are therefore typically produced by machining, or grinding after sintering.

As is commonly known, a sintered compact of $Si_3N_4$ is a very hard material and thus very difficult to machine. Consequently, development in the field of sintered compact applications has been hampered by the technical restrictions imposed due to the difficulties of machining sintered compacts of $Si_3N_4$. Such technical restrictions include, for exmple, a large amount of time and labor required even if such machining is feasible; only relatively simple shape configurations are available with such machining; and particularly, thin parts such as turbine blades typically cannot be produced.

Electric discharge machining is generally known as one of the means for machining into finished parts having complicated shape configurations. However, sintered compacts of $Si_3N_4$ conventionally produced are electrically insulative and thus have not been conventionally thought of as being suitable for electric discharge machining which requires the compact to be electrically conductive.

According to the present invention, however, there has been obtained a conductive sintered compact of $Si_3N_4$ which is machinable by electric discharge machining. The present invention is realized by the addition of powders including a conductivity-supplying agent and a sintering assistant to the $Si_3N_4$ powder. The resulting $Si_3N_4$ powder is then sintered so that the excellent properties associated with conventional sintered compacts of $Si_3N_4$ are maintained while yet producing a sintered compact of $Si_3N_4$ capable of being machined by electrical discharge machining techniques.

More specifically, TiN and/or TiC powders are employed as conductivity-supplying agents and MgO and/or $Al_2O_3$ powders are employed as sintering assistants. The TiN and/or TiC in addition to the MgO powders are crushed to particles measuring 2 μm or smaller in average size before being uniformly dispersed in the $Si_3N_4$ powder and shaped into a compact preform. The resulting preform is then subjected to hot isostatic pressing at an elevated temperature within the range 1,600° to 2,000° C. in a nonoxidizing atmosphere to obtain a sintered compact of $Si_3N_4$ which has a conductivity of 1 $S \cdot cm^{-1}$ or greater and is machinable by electrical discharge machining.

TiN and/or TiC powders are utilized as a conductivity-supplying agent due to their high electrical conductivity (i.e., electrical conductivity of TiN is $4 \times 10^4$ $S \cdot cm^{-1}$, while that of TiC is $3 \times 10^4$ $S \cdot cm^{-1}$) which is substantially equivalent to that of metal, their greater hardness and their stability at high temperature. The use of MgO and/or $Al_2O_3$ on the other hand are used as sintering assistants since addition of a small amount of either is not only effective for the sintering of a $Si_3N_4$ matrix but also contributive to the sintering of TiN and/or TiC.

The percentages of the conductivity-supplying agent and the sintering assistant to be added should preferably be 15 to 40% by volume and 0.01 to 3% by volume, respectively, and the percentage should be determined in consideration of the following points. First, while TiN and TiC as conductivity-supplying agents both exhibit excellent stability at high temperatures, they are both less stable than $Si_3N_4$. Thus, the amount of the TiN and/or TiC additive should be minimized to the extent that satisfactory properties for electrical discharge machining are obtainable. Secondly, the amount of the sintering assistant to be added should also be minimized to the extent that a high sintering density can be obtained.

As described later, the addition of a large amount of the sintering assistant will be followed by excessive growth of $Si_3N_4$ particles, whereby the conductivity-supplying agent and the electrical conductivity (that is, the properties for electrical discharge machining and oxidation resistance at high temperature) will be deleteriously affected.

Further aspects and advantages of the present invention will become more clear after consideration is given to the detailed description in conjunction with the examples.

BRIEF DESCRIPTION OF THE ACCOMPANYING DRAWINGS

Reference will be hereinafter made to the accompanying drawings wherein.

Figure 4:
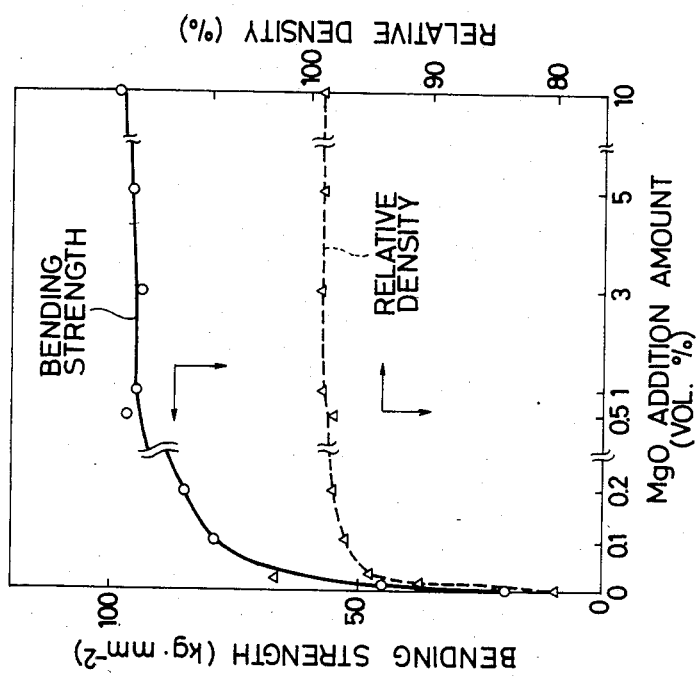
Figure 5:
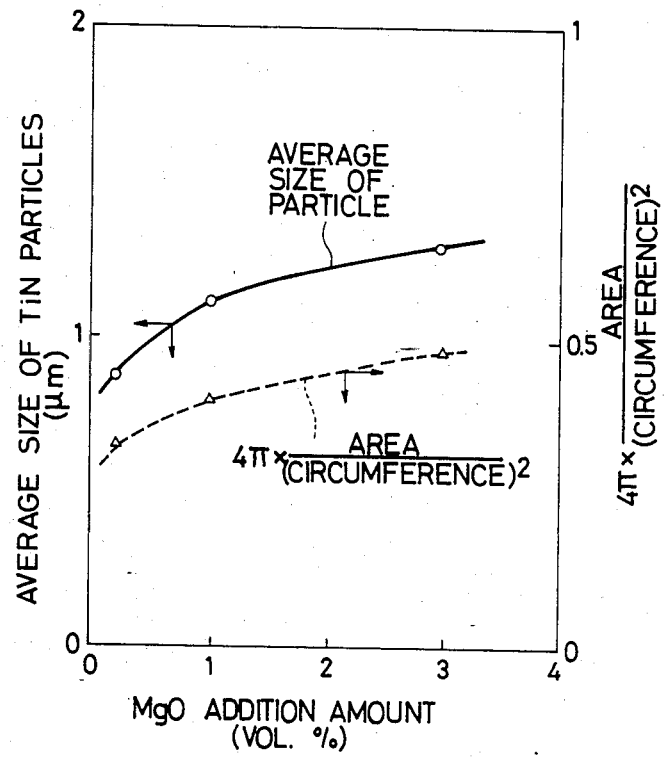

FIG. 4 is a graph illustrating the relationship of the amount of MgO as additive, the electrical conductivity and weight gain by oxidation of the sintered composite with the amount of TiN as additive being maintained constant; and FIG. 5 is a graph illustrating the relationship of the amount of MgO as additive, the average size of TiN particles within the sintered composite and $4\pi \times \text{area}/(\text{circumference})^2$.

DETAILED DESCRIPTION OF THE PREFERRED EXEMPLARY EMBODIMENTS

Referring to the drawings, a detailed description of the exemplary embodiments of the present invention will be given below.

Figure 1:
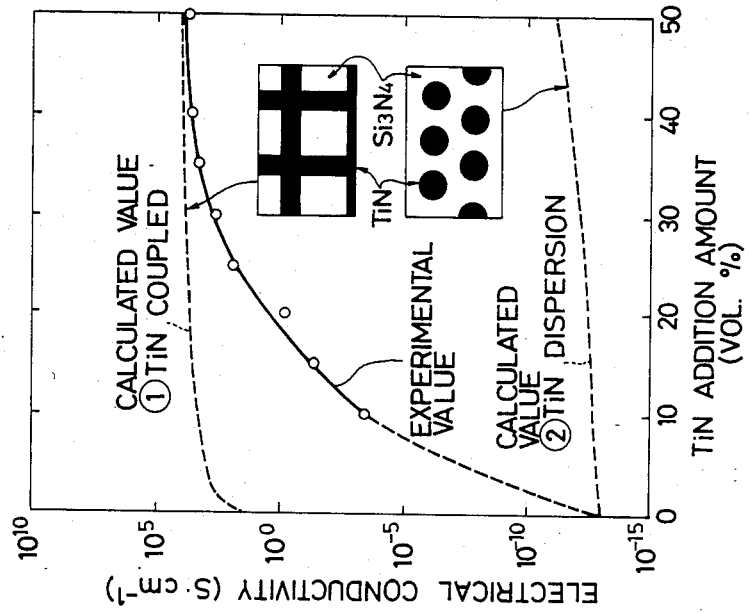
FIG. 1 is a graph illustrating the relationship between the amount of TiN as additive and the electrical conductivity of a sintered composite with the amount of MgO being maintained constant, the calculated values I and II representing the case where TiN is completely coupled and where TiN is completely dispersed, respectively.

It has been discovered (as shown in FIG. 1) that the electrical conductivity of a sintered compact of $Si_3N_4$ changes when prepared by adding TiN and MgO powders to $Si_3N_4$ powder, crushing and blending the powders and then sintering them using hot press techniques, provided that the percentage of MgO powder added is constant (0.5% by volume).

The properties for electrical discharge machining are closely related to the electrical conductivity properties of the resulting sintered compact. Electrical conductivity of a sintered compact to permit electrical discharge machining thereof should be in the order of $10^{-2}$ S·cm$^{-1}$. However, such conductivity must be $10^0$ S·cm$^{-1}$ or greater to allow electrical discharge machines generally in conventional usage to machine the sintered compact and thus even in greater conductivity regions, the properties for electrical discharge machining are improved commensurate with conductivity. The removal rate of the sintered compact during electric discharge machining is seen to increase up to $10^2$ S·cm$^{-1}$, whereas the surface roughness is also seen to improve even in the conductivity region of greater than $10^2$ S·cm$^{-1}$. When electrical discharge machinability are solely taken into consideration, the larger the amount of TiN added, the better.

Figure 2:
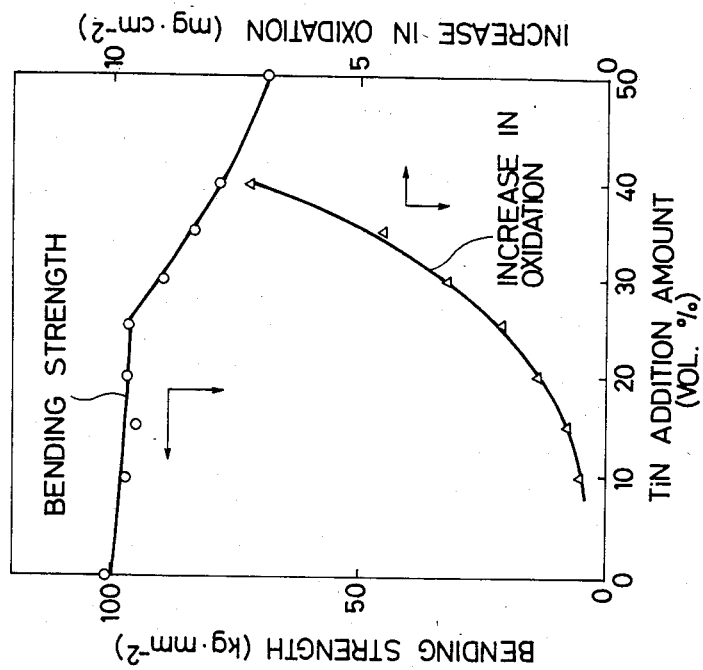
FIG. 2 is a graph illustrating the relationship between the amount of TiN as additive and the bending strength of the sintered composite with the amount of MgO as additive being maintained constant.

On the other hand, the bending strength of the sintered compact and its weight gain by oxidation after it is processed at 1,200° C. in atmosphere for 100 hours change as shown in FIG. 2. The bending strength minimally decreases until the addition of TiN reaches 25% by volume and gradually decreases when the addition thereof exceeds 25% by volume, whereas the increase in weight gain quickly rises as the amount of the TiN additive is increased. Thus, the excellent properties typically associated with $Si_3N_4$ will be lost if large amounts (i.e., greater than 25% by volume) of TiN are added. Accordingly, the amount of the conductivity-supplying agent to be added should be limited to the extent that satisfactory properties for electrical discharge machining are available.

Figure 3:
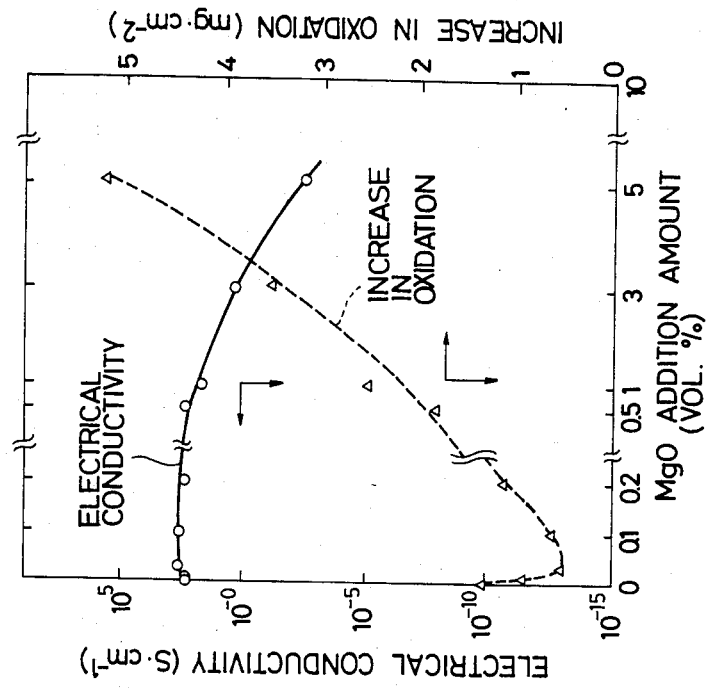
FIG. 3 is a graph illustrating the relationship between the amount of MgO as additive and the bending strength of the sintered composite with the amount of TiN as additive being maintained constant.

On the other hand, if the amount of MgO as an additive is changed while the amount of the additive TiN is kept constant (i.e., 25% by volume), the bending strength of the sintered compact will be that as shown in FIG. 3. The bending strength and the relative density of the sintered compact saturate respectively within the range of 0.2~0.5% by volume of MgO and at 0.2% by volume thereof—that is, in a region where the amount of MgO as additive is extremely small. On the contrary, the electrical conductivity and the weight gain by oxidation (at 1,200° C. in atmosphere for 100 hours) change as is shown in FIG. 4. The electrical conductivity is seen as sharply decreasing at about the point when the amount of MgO exceeds 1% by volume and renders electrical discharge machining impossible at 5% by volume thereof. Weight gain by oxidation is, however, seen to start with a lower range of the percentage of the MgO and also rises drastically.

The reason for the limitation of the amount of the sintering assistant as an additive to the extent that higher density and greater bending strength are obtainable is believed attributed to a reduction in the properties for the resulting sintered compact. The increase in the amount of MgO as an additive allow for excessive growth of TiN particles and excessive formation of a solid TiN-MgO solution. Based on the observation of a lapped face of the sintered compact, it has been found that as the average size of the TiN particles increased (as shown in FIG. 5) the particles became more spherical in shape with corresponding increase in the amount of MgO additive.*

*$4\pi \times \text{area}/(\text{circumference})^2$ is used as a parameter indicative of the similarity between the shape of a particle and a sphere. That is, the greater the similarity, the larger the value becomes such that for a sphere, the value is 1.

As shown in FIG. 1, the electrical conductivity of the sintered compact of $Si_3N_4$—TiN—MgO system approaches the value based on the assumption that all the TiN particles are coupled together as the percentage of the additive TiN increases. Accordingly, the TiN particles in contact with each other are considered present in a region where the amount of the additive TiN is large. The reason for the reduction in the electrical conductivity despite the amount of the additive TiN being constant is considered attributable to the reduced probability of contact of the TiN particles with each other because TiN particles have been rendered coarse and more spherical in shape.

On the other hand, the reason for the growth of the weight gain by oxidation as the amount of the additive MgO increases is considered due to the fact that the rate of the movement of a substance within a TiN particle or the intergranular movement thereof is accelerated because oxidation is inwardly facilitated as the size of the TiN increases and because the formation of the solid TiN—MgO solution or a solid Ti—N—O solution is progressed.

As set forth above, the amounts of the powders of the conductivity-supplying agent and the sintering assistant should preferably be limited to the extent that each of them is capable of maintaining electrical discharge machining properties and the mechanical properties associated with a $Si_3N_4$ sintered compact. For that purpose, it is therefore necessary to increase the effect of the conductivity-supplying agent and the sintering assistant as additives to $Si_3N_4$ powder by respectively furthering the dispersion of the powders and increase the driving force at the time of sintering by selecting the average size of each type of powder prior to sintering at 2 μm or smaller and preferably 0.5 μm or smaller.

The powder prepared in consideration of the above-described points is sintered in a nonoxidizing atmosphere, that is, a gaseous atmosphere preferably containing more than one inert gas of $N_2$, CO, $N_3$, Ar, Ne, and $H_2$ or a vacuum atmosphere at 1,600°~2,000° C. or by the use of hot isostatic pressure (HIP) under similar conditions. The sintering temperature is preferably 1,600° C. or above because high density and increased bending strength are unavailable unless a large amount of sintering assistant is added at temperatures lower than 1,600° C. The sintering temperature is preferably kept below 2,000° C. since resolution and vaporization becomes uncontrollable due to the rise in vapor pressures of the other additives (in addition to that of $Si_3N_4$)

at temperatures greater than 2,000° C. even though the pressure of, e.g., $N_2$ is also raised.

Further understanding of this invention will be obtained by reference to the following nonlimiting examples.

The following reference symbols are used in the columns of the properties for electrical discharge machining in Tables 1-3 illustrated later.

by oxidation (at 1,200° C. under the atmospheric pressure for 100 hours). Table 1 below shows the results obtained.

TABLE 1

| Conductivity supplying agent (% by vol) | Sintering assistant density (% by vo.) | Relative density (%) | Bending strength (kgm-m$^2$) | Electrical conductivity (S · cm$^{-1}$) | Properties for EDM | weight gain by oxidation (mgcm$^{-2}$) |
|---|---|---|---|---|---|---|
| *TiN 25 | MgO 0.5 | 98 | 97 | 3 × 10$^2$ | ◎ | 1.8 |
| *TiN 25 | Al$_2$O$_3$ 1.0 | 98 | 89 | 2 × 10$^2$ | ◎ | 1.5 |
| *TiC 25 | MgO 0.5 | 96 | 88 | 3 × 10$^2$ | ◎ | 1.4 |
| *TiC 25 | Al$_2$O$_3$ 1.0 | 98 | 88 | 3 × 10$^2$ | ◎ | 1.1 |
| **TaN 25 | MgO 0.5 | 98 | 95 | 1 × 10$^2$ | ◎ | 5.8 |
| **TaC 25 | MgO 0.5 | 98 | 94 | 2 × 10$^2$ | ◎ | 5.4 |

*Present Invention
**Comparative Example

As is evident from Table 1, a series of sintered compacts according to the present invention using conductivity-supplying agents of TiN or TiC and sintering assistants of MgO or Al$_2$O$_3$ as additives were machinable while excellent properties of Si$_3$N$_4$ were maintained, whereas those using TaN or TaC as additives showed a disadvantageous increase in weight gain and a reduction in oxidation resistance.

| Symbols | | |
|---|---|---|
| Symbol: | Electrical conductivity: (S · CM$^{-1}$) | EDM conditions: |
| ◎ | 10$^2$ ≦ R | EDM is possible under normal conditions. Stability and removal rate are high. |
| ○ | 10$^0$ ≦ R < 10$^2$ | EDM is possible under normal conditions. Stability and removal rate are low. |
| △ | 10$^{-2}$ ≦ R < 10$^0$ | EDM is possible but requires high voltage. Not for practical use because of instability. |
| X | R ≦ 10$^{-2}$ | EDM is impossible. |

EXAMPLE 1

Sintered compacts of Si$_3$N$_4$ were prepared by adding the conductivity-supplying agents and the sintering assistants shown in Table 1 below to Si$_3$N$_4$ powder, crushing, mixing, and sintering the products of 1,750° C. for one hour in a gaseous atmosphere of $N_2$ at a pressure of 200 kg·cm using a hot press so as to examine the density, bending strength, electrical conductivity, electrical discharge machining properties and weight gain

EXAMPLE 2

Sintered composites of Si$_3$N$_4$ were prepared by adding TiN and MgO powder in Si$_3$N$_4$ powder at the percentages shown in Table 2, crushing, mixing, and sintering the products at 1,750° C. for one hour in a gaseous atmosphere of $N_2$ at a pressure of 200 kg·cm$^{-2}$ using a hot press so as to examine the density, bending strength, electrical conductivity, electrical discharge machining properties and weight gain by oxidation (at 1,200° C. for 100 hours). The results obtained are shown in Table 2.

EXAMPLE 3

Sintered composites of Si$_3$N$_4$ were prepared by adding TiC and MgO powder to Si$_3$N$_4$ powder at the percentages shown in Table 4, crushing, mixing, and sintering the products of 1,800° C. for one hour in a gaseous atmosphere of $N_2$ at a pressure of 200 kg·cm$^{-2}$ using a hot press to examine the density, bending strength, electric conductivity, electrical discharge machining properties and weight gain by oxidation (at 1,200° C. for 10 hours). The results obtained are shown in Table 3.

TABLE 2

| TiN (% by vol) | MgO (% by vol) | Relative density (%) | Bending strength (kgmm$^{-2}$) | Electrical conductivity (S · cm$^{-1}$) | Properties for EDM | weight gain by oxidation |
|---|---|---|---|---|---|---|
| 0 | 0.5 | 99 | 101 | <10$^{-12}$ | X | — |
|  | 5 | 100 | 98 | <10$^{-12}$ | X | 0.6 |
| 10 | 0.5 | 99 | 97 | 3 × 10$^{-4}$ | X | 0.5 |
| 15 | 0.01 | 91 | 48 | 5 × 10$^0$ | ○ | — |
|  | 0.1 | 97 | 75 | 1 × 10$^0$ | ○ | — |
|  | 0.5 | 98 | 95 | 1 × 10$^{-2}$ | △ | 0.8 |
|  | 3 | 99 | 98 | 2 × 10$^{-4}$ | X | — |
| 20 | 0.1 | 98 | 81 | 2 × 10$^1$ | ○ | — |
|  | 0.5 | 98 | 97 | 9 × 10$^{-1}$ | △ | 1.4 |
|  | 3 | 99 | 100 | 4 × 10$^{-2}$ | △ | — |
| 25 | 0 | 80 | 20 | 2 × 10$^2$ | ◎ | 1.3 |
|  | 0.01 | 91 | 45 | 2 × 10$^2$ | ◎ | 0.9 |
|  | 0.03 | 95 | 62 | 3 × 10$^2$ | ◎ | 0.5 |
|  | 0.1 | 97 | 79 | 3 × 10$^2$ | ◎ | 0.6 |
|  | 0.2 | 98 | 85 | 2 × 10$^2$ | ◎ | 1.1 |
|  | 0.5 | 98 | 97 | 3 × 10$^2$ | ◎ | 1.8 |
|  | 1 | 99 | 95 | 6 × 10$^1$ | ○ | 2.5 |
|  | 3 | 99 | 94 | 5 × 10$^0$ | ○ | 3.5 |
|  | 5 | 99 | 96 | 4 × 10$^{-2}$ | △ | 5.2 |
| 30 | 0.1 | 96 | 72 | 8 × 10$^2$ | ◎ | — |
|  | 0.5 | 98 | 90 | 5 × 10$^2$ | ◎ | 3.3 |

TABLE 2-continued

| TiN (% by vol) | MgO (% by vol) | Relative density (%) | Bending strength (kgmm$^{-2}$) | Electrical conductivity (S·cm$^{-1}$) | Properties for EDM | weight gain by oxidation |
| --- | --- | --- | --- | --- | --- | --- |
|  | 3 | 99 | 92 | $1 \times 10^2$ | ◎ | — |
| 35 | 0.1 | 96 | 70 | $3 \times 10^3$ | ◎ | — |
|  | 0.5 | 98 | 84 | $2 \times 10^3$ | ◎ | 5.0 |
|  | 3 | 99 | 85 | $6 \times 10^2$ | ◎ | — |
| 40 | 0.5 | 97 | 79 | $4 \times 10^3$ | ◎ | 7.3 |
| 50 | 0.5 | 97 | 72 | $6 \times 10^3$ | ◎ | — |

TABLE 3

| TiN (% by vol) | MgO (% by vol) | Relative density (%) | Bending strength (kgmm$^{-2}$) | Electrical conductivity (S·cm$^{-1}$) | Properties for EDM | Increase in Oxidation amount (mgcm$^{-2}$) |
| --- | --- | --- | --- | --- | --- | --- |
| 0 | 0.5 | 99 | 95 | $<10^{-12}$ | X | — |
|  | 5 | 100 | 96 | $<10^{-12}$ | X | 0.7 |
| 10 | 0.5 | 97 | 98 | $2 \times 10^{-3}$ | X | — |
| 15 | 0.01 | 88 | 41 | $8 \times 10^0$ | O | — |
|  | 0.1 | 96 | 75 | $4 \times 10^0$ | O | — |
|  | 0.5 | 97 | 92 | $2 \times 10^0$ | O | 1.0 |
|  | 3 | 99 | 95 | $2 \times 10^{-3}$ | X | — |
| 20 | 0.1 | 96 | 71 | $5 \times 10^1$ | O | — |
|  | 0.5 | 97 | 91 | $5 \times 10^1$ | O | 1.0 |
|  | 3 | 99 | 101 | $8 \times 10^{-2}$ | △ | — |
| 25 | 0 | 75 | 15 | $1 \times 10^2$ | ◎ | — |
|  | 0.01 | 85 | 37 | $1 \times 10^2$ | ◎ | — |
|  | 0.03 | 92 | 51 | $3 \times 10^2$ | ◎ | — |
|  | 0.1 | 95 | 65 | $4 \times 10^2$ | ◎ | — |
|  | 0.2 | 96 | 77 | $3 \times 10^2$ | ◎ | 0.9 |
|  | 0.5 | 96 | 88 | $3 \times 10^2$ | ◎ | 1.4 |
|  | 1 | 98 | 97 | $2 \times 10^2$ | ◎ | — |
|  | 3 | 99 | 92 | $6 \times 10^1$ | O | 3.0 |
|  | 5 | 99 | 94 | $2 \times 10^2$ | O | 4.8 |
| 30 | 0.1 | 95 | 61 | $3 \times 10^3$ | ◎ | — |
|  | 0.5 | 96 | 85 | $1 \times 10^3$ | ◎ | 2.1 |
|  | 3 | 98 | 91 | $5 \times 10^2$ | ◎ | — |
| 35 | 0.1 | 93 | 55 | $6 \times 10^3$ | ◎ | — |
|  | 0.5 | 95 | 81 | $4 \times 10^3$ | ◎ | 4.0 |
|  | 3 | 97 | 88 | $1 \times 10^3$ | ◎ | — |
| 40 | 0.5 | 96 | 81 | $6 \times 10^3$ | ◎ | — |
| 50 | 0.5 | 93 | 70 | $8 \times 10^3$ | ◎ | — |

As set forth above, TiN and/or TiC powder as a conductivity-supplying agent and MgO and/or Al$_2$O$_3$ powder as a sintering assistant were added to Si$_3$N$_4$ powder with the powders being crushed into particles measuring 1 μm in average size before being blended together. The resulting mixture was sintered in a nonoxidizing atmosphere under pressure to obtain a sintered compact of Si$_3$N$_4$ having sufficient electrical conductivity and thus machinability by electrical discharge machining while yet maintaining excellent properties inherent in a conventional electrically-insulative sintered composite of Si$_3$N$_4$.

Accordingly, while the present invention has been herein claimed in what is presently conceived to be the most preferred and exemplary embodiments thereof, those in this art may recognize that many modifications may be made which shall be accorded the broadest scope of the appended claims so as to encompass all equivalents thereof.

What we claim is:

1. An electrically-conductive sintered compact of silicon nitride machinable by electrical discharge machining, said sintered compact consisting essentially of a matrix of silicon nitride particles having an average particle size of 2 μm or less, 0.01–1.0% by volume, based on the total mixture volume, of MgO, Al$_2$O$_3$ or a mixture of MgO and Al$_2$O$_3$ powder as a sintering assistant and an additive powder of an electrical conductivity agent selected from the group consisting of at least one of TiN and TiC, in a proportion of 30–40 volume percent, based on the total mixture volume wherein portions of said additive powder are physically coupled with said matrix of silicon nitride particles such that the sintered compact exhibits an electrical conductivity of $10^2$ S·cm$^{-1}$ or greater.

2. A process for producing a sintered compact of silicon nitride machinable by electric discharge machining comprising the steps of:
    adding, to a powder of silicon nitride, 30 to 40% by volume, based on total mixture volume, of TiN, TiC or a mixture of TiN and TiC powder as a conductivity supplying agent;
    adding 0.01 to 1.0% by volume, based on the total mixture volume, of MgO, Al$_2$O$_3$ or a mixture of MgO and Al$_2$O$_3$ powder as a sintering assistant to obtain a compact preform; and
    sintering the compact preform thus obtained at 1,600° C. to 2,000° C. in a non-oxidizing atmosphere, thereby forming a sintered compact of silicon nitride machinable by electrical discharge machining which exhibits an electrical conductivity of $10^2$ S·cm$^{-1}$ or greater.

3. A process for producing a sintered compact of silicon nitride machinable by electrical discharge machining as in claim 2, wherein the silicon nitride powder, the conductivity-supplying agent and the sintering assistant are each 2 μm or less in average particle size prior to sintering.

4. A process for producing a sintered compact of silicon nitride machinable by electrical discharge machining as in claim 3 wherein the average particle size of the silicon nitride powder, conductivity-supplying agent and the sintering assistant are each within the range of 1 μm to 2 μm.

5. A process for producing a sintered compact of silicon nitride machinable by electrical discharge machining as in claim 3 wherein the average particle size of the silicon nitride powder, conductivity-supplying agent and the sintering assistant are each about 0.5 μm.

6. A process for producing a sintered compact of silicon nitride machinable by electrical discharge machining as in claim 2, wherein said nonoxidizing atmosphere is at least one gas selected from the group consisting of $N_2$, CO, $NH_3$, He, Ar, Ne and $H_2$.

7. A process for producing a sintered compact of silicon nitride machinable by electrical discharge machining as in claim 2 wherein said nonoxidizing atmosphere is a vacuum.

* * * * *